United States Patent Office 2,793,979
Patented May 28, 1957

2,793,979

METHOD OF MAKING A SUSTAINED RELEASE PHARMACEUTICAL TABLET AND PRODUCT OF THE METHOD

Edward V. Svedres, Lower Gwynedd Township, Montgomery County, Pa., assignor to Smith, Kline & French Laboratories, Philadelphia, Pa., a corporation of Pennsylvania No Drawing. Application March 30, 1953,
Serial No. 345,731

5 Claims. (Cl. 167—82)

This invention relates to the method of making a timed release pharmaceutical tablet or pellet and to the product of this method.

It has been known heretofore to make enteric coated medicament-containing tablets which prevent the release of the medicament in the stomach. Such enteric preparations normally utilize a composition which will not dissolve in the acid juices of the stomach, but which readily dissolves in the alkaline fluids of the intestine. Thus, while release of the medicament is prevented in the stomach, the medicament is rapidly released in the intestines. By way of marked contrast, one of the problems solved by this invention is to provide a pharmaceutical preparation which will maintain continuously a desired therapeutic level of a selected medicament over an extended period of time, for example, as long as ten to twelve hours. It is a further object of this invention to provide such a timed release pharmaceutical preparation in tablet or pellet form, which breaks down into a very large number of individual time delay particles containing embedded medicament.

According to this invention a time delay material resistant to disintegration in the gastro-intestinal tract and which will slowly disintegrate therein, including in the stomach, such as, for example, an ester of glycerin, is liquefied and then admixed with the selected solid or liquid medicament. This mixture is then solidified and reduced to a powder. The thus formed powder is admixed with a granulating solution and passed through a screen to form time delay granules which are then dried and forced through a smaller screen. The thus formed time delay granules include the time delay material and the medicament carried in a matrix of dried solids from the dehydrated granulating solutions.

The thus formed granules are then thoroughly mixed with non-time delay granules of the selected medicament which can be formed by conventional granulation techniques. In this case the medicament must be in solid form. The solid medicament is reduced to a powder and then wetted with a liquid granulating agent, as, for example, water, an aqueous gelatin solution and starch paste. The thus wetted powder is then passed through a screen to form granules which are then dried. The two types of granules are then thoroughly admixed and tabletted in the conventional tableting machine.

In accordance with this invention the time delay material is a fatty acid, alcohol or ester, alone, or an admixture thereof, and can be modified with a waxy material of natural or synthetic sources. More specifically, the fatty acid may have from 10 to 22 carbon atoms and may be, for example, decenoic, docosanoic, stearic, palmitic, lauric or myristic acid.

The fatty alcohols may have from 14 to 31 carbon atoms and may be, for example, lauryl alcohol, cetyl, stearyl, myristyl, myricyl, arachyl, carnubyl or ceryl alcohol.

The esters may be mono-, di- or triglyceryl esters formed from fatty acids having from 10 to 22 carbon atoms, such as, for example, glyceryl distearate, glyceryl tristearate, glyceryl monostearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate or glyceryl tridecenoate.

The modifying wax material is an ester of a fatty acid having from 12 to 31 carbon atoms and a fatty alcohol having from 12 to 31 carbon atoms, the ester having a carbon atom content of from 24 to 62, or a mixture thereof. Exemplary are myricyl palmitate, beeswax, cetyl palmitate, spermacetic wax, myricyl cerotate, carnauba wax, cetyl myristate, ceryl palmitate, ceryl cerotate, myricyl melissate, stearyl palmitate, stearyl myristate, lauryl laurate. The selected wax material may be as much as 25% by weight of the time delay material.

The time delay material is liquefied simply by heating and/or by the use of an organic solvent. The solvent may be, for example, carbon tetrachloride, chloroform, trichloroethylene, petroleum ether, benzene, toluene, ethyl acetate, xylene, nitrobenzene, acetone, ether, carbon disulfide, methyl ethyl ketone and alcohols, such as, methyl, ethyl and isopropyl alcohol.

As will be obvious, this invention is applicable to any desired solid medicament or any liquid medicament where the liquid medicament need not be administered in large quantities. By way of example, however, the solid medicament may be a sympathomimetic agent, such as, for example, amphetamine sulfate, dextroamphetamine sulfate, racemic amphetamine sulfate, racemic or d-desoxyephedrine hydrochloride, an antispasmodic agent, such as, for example, hyoscyamine, atropine, or scopolamine hydrobromide, an antihistamine, such as, for example, chloroprophenpyridamine maleate, a barbiturate, such as, for example, phenobarbital, barbital, amobarbital, an antibiotic, such as, for example, procaine penicillin, etc.

Conventional inert fillers, such as terra alba, lactose and starch can be added to the solid medicament as desired. When reduced to a powder, before being mixed with the time delay material, the solid medicament and filler, when used, will be of a size to pass through a screen of 20 mesh or smaller in size. A particle size of 35 mesh is preferred. In the time delay granules the solid medicament, alone or together with filler, when used, should not be in excess of 200% by weight of the time delay material.

Amphetamine (free base) and N-phenoxyisopropyl-N-benzyl-β-chlorethylamine (free base) are exemplary of liquid medicaments which can be used in accordance with this invention. Where a liquid medicament is used, it must be admixed with an inert filler such as, for example, terra alba, lactose and starch. The liquid medicament must be not over 10% and, preferably, from about 3 to 7% by weight of the medicament-filler-time delay material mixture, and the filler must be from about 40 to 60% by weight of the medicament-filler-time delay material mixture. This mixture when formed is added to the liquefied time delay material, thoroughly admixed and solidified. The remainder of the process is carried out as in the case of the use of a solid medicament. The inert filler admixed with the liquid medicament will be of a size to pass through a 20 mesh screen.

In accordance with this invention the granulating solution for the time delay granules comprises water, preferably in amount of from 15 to 30% by weight and in no event more than 50% by weight and from 70 to 85% by weight and in no event less than 50% by weight of a monosaccharide of the formula $C_6H_{12}O_6$, such as, for example, dextrose or levulose or a disaccharide of the formula $C_{12}H_{22}O_{11}$, such as, for example, sucrose, lactose or maltose, or a polysaccharide, such as, for example, dextrin, or mixtures thereof.

Alternatively, the granulating solution may contain from 75 to 90% by weight of water and from 10 to 25% by weight of gelatin or a natural plant hydrocolloid, such as acacia, tragacanth, agar, or an alginate, such as sodium alginate, pectin, or chondrus may be used in the same proportions. An aqueous solution of a hexahydric alcohol, such as sorbitol or mannitol can also be used as the granulating solution.

The granulations formed after the addition of the granulating solution are formed through screens having a mesh of from 8 to 12. After the thus formed granules are dried, they are forced through a screen having a mesh of from 12 to 20.

The time delay granules and the non-time delay granules are now thoroughly admixed, both types of granules having been formed to have approximately the same size and when tabletted to provide continuously a desired therapeutic level of the medicament over an extended period of time. Preferably all of the granules contain approximately the same amount of medicament, the non-time delay granules being about 25% to 100% by weight, and preferably 50%, of the time delay granules. The thus formed mixture of granules is then tabletted in a conventional tableting machine.

The final tabletted product comprises time delay granules which include a matrix of dried solids of the dehydrated granulating solution, these dried solids on the time delay granules linking the time delay granules together to form a matrix holding the non-time delay granules.

It will be appreciated that the non-time delay granules can be tabletted in combination with a plurality of groups of time delay granules, the groups utilizing various different time delay materials or different amounts of time delay material, or both, to provide different times of release for each group to maintain continuously a desired therapeutic level.

The invention will be further clarified by the following examples:

EXAMPLE 1

Group A.—Materials used

| | Pounds |
|---|---|
| Dextro-amphetamine sulfate (100%), 60 mesh | 5.0 |
| Lactose, U. S. P., 60 mesh | 57.5 |
| Sucrose (U. S. P. quality), in aqueous solution containing 85% by weight of sucrose to volume of water. | |
| Glyceryl distearate | 25.0 |

The glyceryl distearate was melted. The dextro-amphetamine sulfate and lactose were mixed together and then added to the melted glyceryl distearate while stirring. After a thorough mixing of the glyceryl distearate, dextro-amphetamine sulfate and lactose, the mixture was cooled until it congealed to a hard mass, the stirring being continued as long as possible. The thus formed mass was ground and sieved through a #35 mesh screen. The sucrose syrup was added to the powder thus obtained and thoroughly mixed therewith to mass the powder. The resulting product was granulated through a #10 mesh screen. The thus formed granules were dried overnight at 37° C. and sieved through a #14 mesh screen.

Group B.—Materials used

| | Pounds |
|---|---|
| Dextro-amphetamine sulfate (100%), 40 mesh | 5.0 |
| Terra alba (variable amount), 40 mesh | 64.0 |
| Lactose, U. S. P., 40 mesh | 5.0 |
| Sucrose, U. S. P. (powdered), 40 mesh | 20.0 |
| Starch (powdered), U. S. P., 40 mesh | 5.0 |
| Gelatin in aqueous solution containing 13% by weight of gelatin to volume of water. | |

The dextro-amphetamine sulfate, terra alba, lactose, sucrose and starch were thoroughly mixed and then massed with the gelatin solution. The resulting mass was granulated through a #9 mesh screen and dried overnight at 37° C. After being thus dried, the granules were sieved through a #14 mesh screen.

Equal quantities by weight of the granules of groups "A" and "B" were thoroughly mixed together and tabletted in 300 mg. tablets.

EXAMPLE 2

Materials used

| | Pounds |
|---|---|
| Dextro-amphetamine sulfate (100%), 35 mesh | 5.0 |
| Lactose, U. S. P., 35 mesh | 32.0 |
| Sucrose (U. S. P.), in aqueous solution containing 80% by weight of sucrose to volume of water. | |
| Glyceryl distearate | 50.0 |

Granules were made using the above formulation following the identical procedure found in Example 1 for making. The thus formed granules were mixed with equal amounts by weight of Group A and Group B granules of Example 1 and tabletted in 300 mg. tablets.

EXAMPLE 3

Group A.—Materials used

| | | |
|---|---|---|
| Benzyl penicillin, procaine, U. S. P., 150 mesh | pounds | 3.7 |
| Glyceryl monostearate, N. F. | do | 4.5 |
| Beeswax, white, U. S. P. | do | 0.5 |
| Sucrose, U. S. P. (in aqueous solution containing 85% by weight of sucrose to volume of water) | pounds | 1.3 |
| Carbon tetrachloride, N. F. | gallons | 5 |

The glyceryl monostearate and beeswax were dissolved in the carbon tetrachloride and the procaine penicillin added. The mixture was well mixed and a vacuum applied (15 mm.) to remove the carbon tetrachloride from the mixture. This was continued until all carbon tetrachloride was removed, during the vacuum process stirring was continued as long as possible. The thus formed residual mass was ground and sieved through a #45 mesh screen. The sucrose syrup was added to the powder thus obtained and thoroughly mixed therewith to mass the powder. The resulting product was granulated through a #12 mesh screen. The thus formed granules were dried 6 hours at 40° C. and sieved through a #18 mesh screen.

Group B.—Materials used

| | Pounds |
|---|---|
| Benzyl penicillin, procaine, U. S. P., 160 mesh | 3.7 |
| Lactose, U. S. P., 80 mesh | 3.7 |
| Sucrose, U. S. P., 80 mesh | 2.0 |
| Starch, U. S. P., 120 mesh | 0.5 |
| Gelatin (aqueous solution containing 15% by weight of gelatin to volume of water) | 0.1 |

The penicillin, lactose, sucrose and starch were thoroughly mixed and then massed with the gelatin solution. The resulting mass was granulated through a #10 mesh screen and dried 6 hours at 40° C. After being thus dried the granules were sieved through a #16 mesh screen. Equal quantities by weight of the granules of groups "A" and "B" were thoroughly mixed together and tabletted into 600 mg. tablets.

EXAMPLE 4

Group A.—Materials used

| | Pounds |
|---|---|
| Amobarbital, N. F., 80 mesh | 30.0 |
| Sucrose, U. S. P., 65 mesh | 32.5 |
| Sorbitol (in aqueous solution containing 70% by weight of sorbitol to volume of water) | 12.5 |
| Glyceryl monopalmitate | 22.5 |
| Beeswax | 2.5 |

The glyceryl monopalmitate and beeswax were melted together. The amobarbital and sucrose were mixed together and then added to the melted glyceryl monopalmitate and beeswax while stirring. After a thorough mixing of the glyceryl monopalmitate, beeswax, amobarbital, and sucrose, the mixture was cooled until it congealed to a hard mass, the stirring being continued as long as possible. The thus formed mass was ground and sieved through a 40 mesh screen. The sorbitol solution was added to the powder thus obtained and thoroughly mixed therewith to mass the powder. The resulting product was granulated through a 12 mesh screen. The thus formed granules were dried 10 hours at 37° C. and sieved through a 20 mesh screen.

Group B.—Materials used

| | Pounds |
|---|---|
| Amobarbital, N. F., 70 mesh powder | 30.0 |
| Terra alba, 65 mesh | 39.0 |
| Sorbitol, crystalline, 50 mesh | 5.0 |
| Sucrose, U. S. P., 70 mesh | 20.0 |
| Starch, U. S. P., 80 mesh powder | 5.0 |
| Acacia (aqueous solution containing 10% by weight of acacia to volume of water) | 1.0 |

The amobarbital, terra alba, sorbitol, sucrose, and starch were thoroughly mixed and then massed with the acacia solution. The resulting mass was granulated through a 12 mesh screen and dried 10 hours at 42° C. After being thus dried the granules were sieved through a 20 mesh screen. Equal quantities by weight of the granules of groups "A" and "B" were thoroughly mixed together and tabletted into 150 mg. tablets.

EXAMPLE 5

Group A.—Materials used

| | Pounds |
|---|---|
| "Dibenzyline" (N - phenoxyisopropyl - N - benzyl-β-chlorethylamine free base) | 2.5 |
| Lactose, U. S. P., 40 mesh | 30.0 |
| Sorbitol (in aqueous solution containing 70% by weight of sorbitol to volume of water) | 7.0 |
| Glyceryl monostearate | 11.5 |

The glyceryl monostearate was melted. The "Dibenzyline" and lactose were mixed together and then added to the glyceryl monostearate while stirring. After a thorough mixing of the glyceryl monostearate, "Dibenzyline" and lactose, the mixture was cooled until it congealed to a hard mass, the stirring being continued as long as possible. The thus formed mass was ground and sieved through a 40 mesh screen. The sorbitol solution was added to the powder thus obtained and thoroughly mixed therewith to mass the powder. The resulting product was granulated through a 14 mesh screen. The thus formed granules were dried 7 hours at 37° C. and sieved through a 16 mesh screen.

Group B.—Materials used

| | Pounds |
|---|---|
| "Dibenzyline" (N - phenoxyisopropyl - N - benzyl-β-chlorethylamine free base) | 2.5 |
| Terra alba, 55 mesh | 60.0 |
| Lactose, U. S. P., 65 mesh | 9.0 |
| Sucrose, U. S. P., 50 mesh | 20.0 |
| Starch, U. S. P., 50 mesh | 5.0 |
| Gelatin (aqueous solution containing 13% by weight of gelatin to volume of water) | 1.0 |

The "Dibenzyline," terra alba, lactose, sucrose, and starch were thoroughly mixed and then massed with the gelatin solution. The resulting mass was granulated through a 10 mesh screen and dried 8 hours at 37° C. After being thus dried the granules were sieved through a 16 mesh screen. Equal quantities by weight of the granules of groups "A" and "B" were thoroughly mixed together and tabletted into 400 mg. tablets.

EXAMPLE 6

Group A.—Materials used

| | Pounds |
|---|---|
| Chloroprophenpyridamine maleate, 50 mesh | 5.0 |
| Terra alba, 60 mesh | 45.0 |
| Sucrose, U. S. P. (aqueous solution containing 75% by weight of sucrose to volume of water) | 15.0 |
| Cetyl alcohol, N. F. | 10.0 |
| Stearic acid, N. F. | 5.0 |
| Glyceryl trilaurate | 20.0 |

The cetyl alcohol, stearic acid, and glyceryl trilaurate were melted together. The chloroprophenpyridamine maleate and terra alba were added to the melted mixture while stirring. After a thorough mixing of the cetyl alcohol, stearic acid, glyceryl trilaurate, and chloroprophenpyridamine maleate, the mixture was cooled until it congealed to a hard mass, the stirring being continued as long as possible. The thus formed mass was ground and sieved through a 30 mesh screen. The sucrose syrup was added to the powder thus obtained and thoroughly mixed therewith to mass the powder. The resulting product was ground through a 14 mesh screen. The thus formed granules were dried 10 hours at 37° C. and sieved through an 18 mesh screen.

Group B.—Materials used

| | Pounds |
|---|---|
| Chloroprophenpyridamine maleate, 60 mesh | 5.0 |
| Terra alba, 60 mesh | 65.0 |
| Lactose, U. S. P., 60 mesh | 4.0 |
| Dextrose, 40 mesh | 20.0 |
| Starch, U. S. P., 80 mesh | 5.0 |
| Gelatin (aqueous solution containing 13% by weight of gelatin to volume of water) | 1.0 |

The chloroprophenpyridamine maleate, terra alba, lactose, dextrose, and starch were thoroughly mixed and then massed with the gelatin solution. The resulting mass was granulated through a 14 mesh screen and dried 6 hours at 40° C. After being thus dried the granules were sieved through an 18 mesh screen. Equal quantities of groups "A" and "B" were thoroughly mixed together and tabletted into 200 mg. tablets.

It is not desired to be limited except as set forth in the following claims, the above description being by way of illustration only.

What is claimed is:

1. A sustained release pharmaceutical tablet comprising non-sustained release granules of a selected solid medicament, sustained release granules comprising said medicament dispersed in solid fatty material resistant to disintegration and slowly dispersible in the gastro-intestinal tract, each of said sustained release granules including, in addition to said medicament and said solid fatty material, a carrying matrix of dried syrup solids from a dehydrated granulating solution, and the sustained release granules taken together forming a matrix holding the non-sustained release granules, said tablet maintaining a therapeutic level of the medicament over an extended period of time.

2. The method of forming a sustained release pharmaceutical tablet which comprises liquefying a sustained release material comprising a solid fatty material resistant to disintegration and slowly dispersible in the gastro-intestinal tract, dispersing a medicament in said liquefied material, solidifying the mass and reducing it to a powder, mixing the thus formed powder with a granulating syrup solution, granulating and drying said mixture to provide sustained release granules, mixing the thus formed sustained release granules with granules of the selected medicament free of sustained release material, all of the granules being about the same size, and tabletting the thus formed mixture.

3. The method of forming a sustained release pharmaceutical tablet which comprises liquefying a sustained release material comprising a solid fatty material resistant to disintegration and slowly dispersible in the gastro-intestinal tract, dispersing a medicament in said liquefied material, solidifying the mass and reducing it to a powder, mixing the thus formed powder with a granulating syrup solution, granulating and drying said mixture to provide sustained release granules of a size of from 8 to 12 mesh, mixing the thus formed sustained release granules with granules of the selected medicament free of sustained release material, all of the granules being about the same size, and tabletting the thus formed mixture.

4. The method of forming a sustained release pharmaceutical tablet which comprises liquefying a sustained release material comprising a solid fatty material resistant to disintegration and slowly dispersible in the gastro-intestinal tract, dispersing a medicament in said liquefied material, solidifying the mass and reducing it to a powder, mixing the thus formed powder with a granulating syrup solution, granulating and drying said mixture to provide sustained release granules, mixing the thus formed sustained release granules with granules of the selected medicament free of sustained release material, all of the granules being about the same size, and tabletting the thus formed mixture, the non-sustained release granules being about 25 to 100% by weight of the sustained release granules.

5. A sustained release pharmaceutical tablet comprising non-sustained release granules of a selected solid medicament, sustained release granules comprising said medicament dispersed in solid fatty material resistant to disintegration and slowly dispersible in the gastro-intestinal tract, the non-sustained release granules being about 25 to 100% by weight of the sustained release granules, each of said sustained release granules including in addition to said medicament and said solid fatty material, a carrying matrix of dried syrup solids from a dehydrated granulating solution, the sustained release granules taken together forming a matrix holding the non-sustained release granules, said tablet maintaining a therapeutic level of the medicament over an extended period of time.

References Cited in the file of this patent

UNITED STATES PATENTS

| | | |
|---|---|---|
| 1,928,346 | Axelrod | Sept. 26, 1933 |
| 2,055,083 | Klein et al. | Sept. 22, 1936 |
| 2,086,766 | Chuck | July 13, 1937 |
| 2,142,537 | Tisza | Jan. 3, 1939 |
| 2,195,596 | Nitardy | Apr. 2, 1940 |
| 2,207,990 | Miller | July 16, 1940 |
| 2,478,182 | Consolazio | Aug. 9, 1949 |
| 2,538,092 | Gakenheimer | Jan. 16, 1951 |
| 2,553,806 | Bogin et al. | May 22, 1951 |
| 2,566,200 | Hickey | Aug. 28, 1951 |
| 2,619,447 | Malcolm et al. | Nov. 25, 1952 |

FOREIGN PATENTS

| | | |
|---|---|---|
| 109,438 | Australia | Dec. 22, 1939 |

OTHER REFERENCES

Chain Store Age (Di-Barbs), Drug Store Mgr's. Ed., Sec. 1, June 1949, p. 95.

Tablet Making, Little et al., England, 1949, pp. 35 and 36.